M. SATTERLEE.
Grain Drill.
No. 9,879.  Patented July 26, 1853.
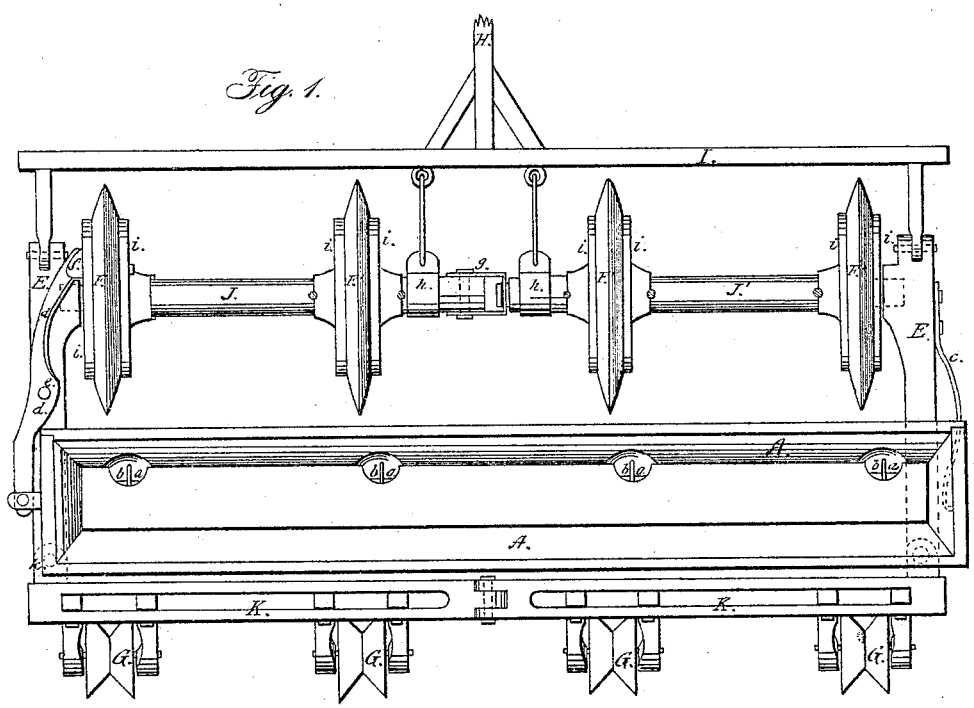
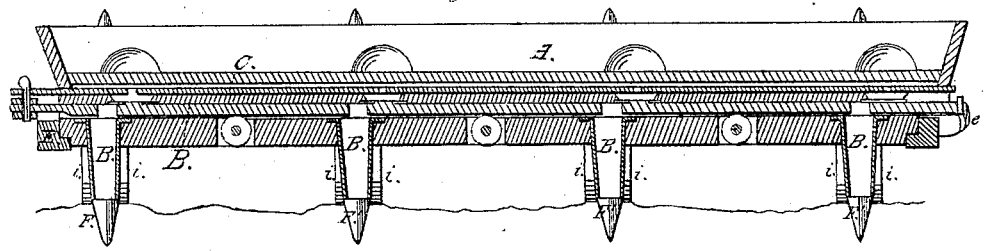
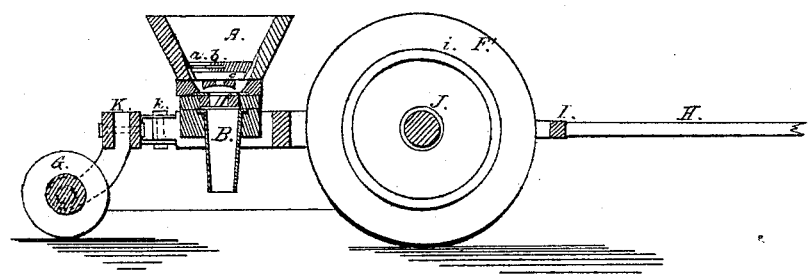

UNITED STATES PATENT OFFICE.

MILTON SATTERLEE, OF LOUISA, ILLINOIS.

IMPROVEMENT IN SEED-PLANTERS.

Specification forming part of Letters Patent No. 9,879, dated July 26, 1853.

*To all whom it may concern:*

Be it known that I, MILTON SATTERLEE, of Louisa, in the county of Stephenson and State of Illinois, have invented certain new and useful Improvements in Seed-Drills, of which the following is a full, clear, and exact description, reference being had to the accompanying drawings, which form part of this specification, and in which—

Figure 1 is a top view or plan of my improved seed-drill. Fig. 2 is a vertical section taken longitudinally through the center of the hopper, and Fig. 3 is a vertical section transversely thereof.

In planting corn and other grain or seed it is desirable that the parallel furrows should be of equal depth, be gaged to an equal width, and the soil displaced to form the furrow be prevented from falling back and filling it again until after the seed is deposited. These objects have not heretofore been attained as fully as was desirable in the various seed-drills in use, owing to their inflexibility of construction, which does not admit of their accommodating themselves sufficiently to the undulations of the ground, and the want of suitable contrivances to pack the earth at the sides of the furrows sufficiently to prevent it from falling back until purposely moved back to cover the seed. Much imperfection also has existed in the devices adopted for covering the seed after it is planted. Common cultivator or drill teeth, especially in rough ground encumbered with stones, stumps, or other hard obstructions, are so liable to be broken that they must of necessity be turned back or raised when they meet stumps, large stones, and other like obstacles, to comply with which requirement various contrivances are resorted to, the most successful of which is a method of connecting the drill-tooth with the drag-bar by a wooden pin of such strength as to be broken by any unusual resistance met with by the tooth; but this expedient is clumsy and inconvenient, like most or all of the other devices which have been designed to accomplish the same object.

To adapt the drill more perfectly to the undulations of the ground, and to simplify the arrangements for drilling and covering, also to economize labor and obviate breakage when meeting with obstructions, are the main objects of my invention.

The hopper A of my improved drill is an oblong trough with inclined sides, wide at the top and narrow at the bottom. It may be divided into several compartments or not, as required. It differs from the ordinary hoppers in use in its construction and in the arrangement of the devices for conducting the grain from the hopper to the depositing-tubes B, which have the feed or supply kept up to them in the most easy, equal, and certain manner by means of the following arrangements and devices: The seed or grain is prevented from clogging in the hopper by causing it to be fed gently down the inclined sides of the hopper through side openings, $a$, in which fingers $b$ project, by which it is more or less agitated by the reciprocating action of an upper slide, C, under which the grain passes to the orifices leading to the lower slide, D, that is only operated on at regular intervals to admit the passage of the grain through it to the depositing-tubes B, the slides C and D having an intermittent reciprocating motion communicated to them in the direction of their length by the reciprocal action of a spring, $c$, and a lever, $d$. One end of this latter is jointed to the slides, and is pivoted by a fulcrum-pin, $e$, to one of the side frames, E, of the drill, the front end of the lever $d$ being operated on by cam-projections $f$, that are situated in any required and variable number round or on the outer face of the outside drill-wheel, F, which, together with the remaining drill-wheels, F', and rear covering-wheels, G, form the bearing or carrying wheels of the machine.

The tongue H of the drill is constructed in the ordinary manner, and is attached to a swiveling bar, I, that connects it with the side frames, E.

The drill-wheels F and F' are fast to shafts J and J', which are united and connected, so as to turn separately, by a hinge-joint, $g$, in the center, that allows the wheels on either shaft J or J' to rise or fall with the undulations of the ground without affecting the wheels on the other shaft, both shafts J and J' being supported at their inner ends by bearings $h$, which are loosely hung or attached by hooks to the swiveling bar I, so that an easy play or flexibility is given to the shafts J and J'. The drill-wheels F and F' are of angular section at their peripheries, corresponding with the transverse section of the required furrows, which are thus ruts formed by the indentation of the wheels into the surface of the ground. The peripheries of the wheels F and F' are separated from the hubs by a flange, *i*, projecting from either side of the inner periphery of each of them. These rims should be of cast-iron, while the center part of the wheel may be of wood.

At the back of the hopper, and following in the same line or track as the wheels F and F', are covering-wheels G, that work in brackets projecting from a swinging frame, K, which is jointed in the middle, so as to admit of vertical play, and hung at either end on pins projecting from swinging straps *k*, that allow of the moving of the frame K slightly in a longitudinal direction. The wheels G are formed with deep angular grooves on their peripheries, corresponding in shape with the transverse section of the hill or covered furrow required.

Scrapers may be attached to the drill to clear the wheels F, F', and G of any adhering soil that they may lift.

The machine being set in motion to furrow the land, sow the seed, and cover it, the wheels F F', by their angular peripheries, indent the furrows, while their flanges *i* compress the top edges of the furrows and prevent the displaced soil from slipping back, also prevent the wheels from sinking too deep into the soil, and insure a regular depth and breadth of furrow. The grain being deposited from the tubes B in the clear furrows thus made, the covering-wheels G follow and fill in the displaced soil, compressing the sides of the furrow into the middle by their angular ribs that form the sides of the groove round their periphery. Thus the wheels G perform the office of covering the seed in the most perfect and regular manner. Both these and the drill-wheels will readily ride over any stones, stumps, or other obstructions which occur, or by the angular shape of the wheels F F' push the obstacles aside, if loose and light, without risk of breakage. The usual ponderous carrying-wheels also being dispensed with, and the whole weight of the machine being thrown upon the drill and covering wheels, the former, F and F', will cut into and drill the stiffest soil, while the flexibility in suspension at the center of the machine, given to the drill and covering wheels by the hinge-joint *g* and jointed frame K, will cause the said wheels to accommodate themselves to the undulations of the ground, and particularly adapt themselves to ridge and furrow land, so that the parallel drills will all be equally formed and covered.

It is obvious that numerous modifications in the construction and arrangement of the several parts of the machine may be made, and the mechanical equivalents of some of them may be substituted without any departure from the principle of the invention—as, for example, instead of agitating and discharging the grain by the furrowing-wheels, I can do it by cam-projections attached to the covering-wheels.

The flexible axles can also be used with common cultivator-teeth as well as with the rollers or wheels. Numerous other like changes might be made, but it is not necessary to specify them particularly.

Having thus described my improved seed-drill, what I claim as new therein, and desire to secure by Letters Patent, is—

The arrangement of the drill and covering wheels or their equivalents on flexible axles, so that the said wheels or their substitutes will rise and fall to accommodate themselves to undulating ground, whereby the grain in all the furrows is planted at an equal depth and equally covered, substantially as specified.

In testimony whereof I have hereunto subscribed my name.

MILTON SATTERLEE.

Witnesses:
 SAML. F. DADDS,
 BENJAMIN GALBRAITH.